TELEVISION WIDTH LINEARITY CONTROL

Filed Jan. 27, 1961 2 Sheets-Sheet 1

WITNESSES
John E. Heasley Jr.
James T. Young

INVENTORS
Harry W. Claypool &
Charles Ondrejik
BY
Benjamin DeWitt
ATTORNEY

Oct. 13, 1964 H. W. CLAYPOOL ETAL 3,153,174

TELEVISION WIDTH LINEARITY CONTROL

Filed Jan. 27, 1961 2 Sheets-Sheet 2

United States Patent Office 3,153,174
Patented Oct. 13, 1964

3,153,174
TELEVISION WIDTH LINEARITY CONTROL

Harry W. Claypool, Franklin Township, Somerset County, and Charles Ondrejik, South Plainfield, N.J., assignors to Westinghouse Electric Corporation, East Pittsburgh, Pa., a corporation of Pennsylvania Filed Jan. 27, 1961, Ser. No. 85,433
3 Claims. (Cl. 315—27)

This invention relates to horizontal deflection systems for cathode ray tubes, and more particularly to improvements of scan linearity control and scan width control in such systems.

In horizontal deflection systems of the type commonly employed in television receivers, horizontal deflection current is supplied to the horizontal deflection coils of the deflection yoke by the cooperative functioning of a driver tube, an output transformer or autotransformer, and a damper diode or rectifier. While it is desired to provide substantial linearity of the cathode ray scanning as a function of time, it does not follow that the deflection current in the horizontal deflection coils should be exactly linear. In wide angle scan systems utilizing substantially flat faced cathode ray tubes, the cathode ray spot displacement per degree of angular deflection of the beam is not a linear or constant function, but rather the spot displacement varies approximately as the tangent of the beam deflection angle. The foregoing is particularly true near the sides of the cathode ray screen where the deflection angle is large. Thus, with wide angle cathode ray tubes, it is not desired to provide precise linearity of the deflection current in the horizontal deflection coils; rather the trace portion of the deflection current waveform should have a slight S-shaped curvature with the central portion being substantially linear and having a maximum slope and with the first part and the latter part both having slightly lesser slopes.

Specifically, it is most desirable that the trace portion of the deflection current waveform should have a minimum slope at its beginning with the slope gradually increasing until it reaches a maximum slope at the region where the trace current passes through zero and with the slope thereafter gradually decreasing until it reaches approximately the same minimum slope at the end of the scan interval. With conventional horizontal deflection systems the deflection current waveform tends to be exponential rather than linear during each scan interval. Its slope tends to be relatively larger at the beginning, somewhat smaller during the central portion of the trace and considerably smaller at the end of each scan interval. This tends to make the line scanning motion of the electron beam too fast at the beginning and too slow at the end of each line scan for best picture geometry. By astute choice of deflection circuit components, it is possible to develop a deflection current waveform which has almost exactly the right exponential component to provide the desired or ideal curvature in the latter half of the trace interval. Such circuit component selection does not provide the desired deflection current waveform during the first half of the trace, but rather aggravates the existing conditions by making the waveform slope at the very beginning of the trace period somewhat greater than the slope at the middle of the trace.

It may be observed that the foregoing objection can be overcome by producing a modification of that component of the deflection coil current which flows through the damper diode. Since the deflection current during trace intervals is the algebraic sum of the transformed output current of the drive tube and the current through the damper tube, the deflection current waveform can be modified as desired by appropriate modification of the current through the damper tube. In the prior art, various arrangements to develop a corrective voltage using active circuit components responsive to the driver tube output current or the damper tube current have been proposed. Such prior arrangements have been excessively expensive and have been somewhat unsatisfactory because they are unduly affected by variations in the deflection current waveform and amplitude as well as being affected by variations in the loading on the horizontal deflection system and variations in supply voltages.

A primary object of the present invention is to overcome the objections of prior systems of the general character above described, and to provide improved means for achieving substantial scan linearity through control of the damper current during the first part of the scan interval.

Another object of the present invention is to provide a novel arrangement for eliminating or minimizing certain undesired types of non-linearity in the deflection current waveform applied to the horizontal deflection coils of cathode ray deflection systems.

A further object of the invention is to provide an improved reactor means in such systems for enabling facile adjustment of horizontal linearity and horizontal picture width.

An additional object of the invention is to provide simple, efficient and inexpensive arrangements for effecting wave shape control and amplitude control of scan current waveforms in such systems.

The details of operation of flyback type horizontal deflection systems of the type here involved are well known; hence, it is unnecessary to fully describe such details. It is sufficient to emphasize that during the trace portion of successive operating cycles the deflection current waveform tends to be exponential rather than linear. The present invention is based upon the concept of utilizing the natural tendency of the waveform to be exponential during the latter portion of the trace portion to produce the portion of the desired S-shaped waveform which corresponds to the latter half of the trace interval and is further based upon the concept of dynamically varying the circuit impedances through which the scan current flows to produce the desired scan current waveform curvature during the first half of the trace interval. In accordance with this invention, there is provided a horizontal deflection system comprising an output transformer to which the horizontal deflection coils are coupled for supplying deflection current to the coils, a damper diode also connected to the transformer in cooperative association with the deflection coils, and means including certain non-linear reactive components in circuit with the deflection coils and damper rectifier as hereinafter described.

In a preferred embodiment of the invention, an auxiliary inductor is provided in series with the deflection coils and is magnetically biased so as to exhibit a non-symmetrical hysteresis loop or magnetic saturation characteristic, in order to present one impedance characteristic to forward current flow while presenting a substantially different impedance characteristic to reverse current flow therethrough. Further, in accordance with the preferred embodiment of the invention, the auxiliary inductor is provided with means for variably adjusting the degree of magnetic biasing and is provided with means for variably adjusting the nominal or average reactance in order to provide for adjustment of the horizontal scan width or picture width.

The foregoing and other concepts and objects of this invention will be apparent from the following description taken with the accompanying drawing, throughout which like reference characters indicate like parts, which drawing forms a part of this application, and in which.

Figure 1:
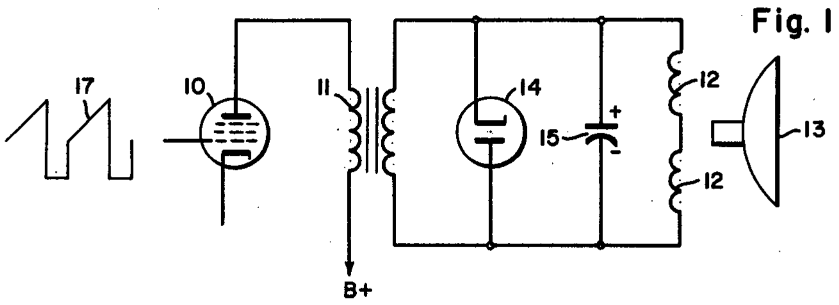
FIGURE 1 is a simplified schematic diagram of the pertinent portions of a conventional horizontal deflection system, which diagram is useful in explaining the theory and principles of the present invention.

The concepts of the present invention may be best understood by first considering in some detail the somewhat idealized horizontal deflection system illustrated by FIG. 1. The deflection system comprises essentially a driver tube 10, the output transformer 11, the damper rectifier 14, and horizontal deflection coils represented at 12. The deflection coil 12 normally comprises part of the deflection yoke for the cathode ray tube 13. In accordance with conventional practice, the anode of the driver tube 10 is connected to one end of the primary winding of transformer 11. The two halves of the deflection coil winding 12 are connected in series across the secondary of the transformer 11 and are shunted by the damper rectifier 14 and by a capacitor 15 which represents all the distributed capacitances, stray capacitances and actual shunt capacitances in the system including the capacitances which are reflected from the primary circuit of the transformer.

In operation of such an idealized horizontal deflection system, a signal such as represented at 17, is supplied to the control grid of the driver tube 10, and the latter serves as a switch to control the supply of energy to the horizontal deflection coils 13 through transformer 11. The driver tube 10 and the damper rectifier 12 are conductive during different portions of each trace interval. The deflection current in the deflection coils 12 during the trace interval is the algebraic sum of the transformed output current of tube 10 and the damper rectifier current. Specifically, during the first half of the trace interval, the damper rectifier 14 conducts to permit a so-called "reverse" electron current to flow upwardly through the deflection coils 12 and downwardly through the rectifier 14. During the latter half of the trace interval, the damper tube is rendered non-conductive, driver tube 10 forces a sawtooth current through the primary of transformer 11, and "forward" electron current flows downward through the deflection coils 12 and upward through the secondary of the transformer 11. At the end of the trace interval, the coils 12 are conducting a maximum forward current and therefore have maximum inductive energy stored therein. At the beginning of the retrace interval, driver tube 10 is abruptly rendered nonconductive by the negative going edge of the input signal 17; the abrupt termination of plate current through transformer 11 immediately thereafter prohibits inductive current from flowing through the secondary winding from the deflection coils 12. Accordingly, during the first half of the retrace interval, the inductive energy in windings 12 is transferred to capacitor 15 with the voltage on capacitor 15 rising to a maximum and the current through the coils 12 falling to zero. The foregoing first half of the retrace interval is designated by the time interval $t_1$–$t_2$ in FIG. 4.

Figure 4:
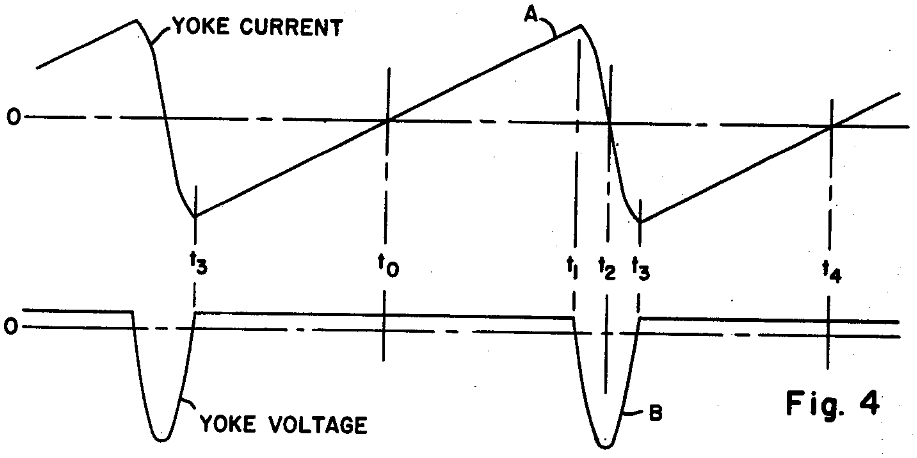
FIG. 4 is a graph of current and voltage waveforms useful in explaining the concepts and operation of the present invention.

Curve A in FIG. 4 illustrates a conventional deflection current waveform such as ideally would be produced by the circuit of FIG. 1. Curve B in FIG. 4 illustrates the voltage appearing across the deflection coils 12 in such a system. The time interval $t_0$–$t_1$ illustrates the time interval during which the driver tube 10 forces a linearly increasing current through the coils 12. Interval $t_1$–$t_2$ is the interval during which the deflection coils 12 discharge their stored energy and capacitor 15 charges to its maximum voltage as indicated by curve B. Interval $t_2$–$t_3$ illustrates the interval during which reverse current builds up through the inductors 12 in response to the voltage applied thereto from capacitor 15. At time $t_3$ the oscillatory voltage appearing across the coils 12 and capacitor 15 passes through zero, and capacitor 15 begins to charge up in the opposite direction. That is, the top end of the capacitor begins to charge negatively with respect to the lower end.

The negative voltage at the top of capacitor 15 at time $t_3$ is applied to the cathode of rectifier 14 to render it conductive and thereafter permit current flow in the "reverse" direction from the coils 12 through the damper rectifier 14. Such reverse current flow through rectifier 14 during the time interval $t_3$–$t_4$ effectively dissipates the reactive energy stored in the deflection coils 12 and transformer 11. The first half of the trace interval is defined by time $t_3$–$t_4$. The latter half of the trace interval is indicated by the time $t_0$–$t_1$. At time $t_3$ the yoke current (reverse) is maximum. Thus, maximum energy is stored in the deflection coils 12. During the first half of the trace interval with the damper conducting, there is a gradually decreasing reverse current through the deflection coils 12. At time $t_4$ (or $t_0$), the yoke discharge current reaches zero. The driver tube 10 then starts conducting through the transformer primary thereby inducing forward current flow through the transformer secondary to the deflection coils 12. During the time $t_0$–$t_1$, the transformer applies a substantially constant voltage to the deflection coils 12, thereby causing a linearly increasing current therethrough. If the deflection coils were an ideal inductance, the slope of the deflection current wave would be perfectly linear during the time interval $t_0$–$t_1$. In practice, deflection current increases at a maximum rate at the beginning of the period $t_0$–$t_1$ and the slope of the current wave gradually bends over or decreases as the maximum deflection coil current is approached near the time $t_1$.

For flat face cathode ray tubes and for large scan angles (such as 110° or 114°), spot displacement from screen center is proportional to tangent $\theta$ (where $\theta$ is the beam deflection angle from center) and specifically is not directly proportional to $\theta$. Thus, for such flat face tubes, spot displacement is not proportional to deflection coil current but rather is approximately proportional to the tangent of an angle which is propotrional to the deflection coil current. Accordingly, at large deflection angles, spot displacement increases more rapidly than the deflection coil current. If the deflection coil current waveform were perfectly linear, a plot of spot displacement as a function of time would be non-linear and upwardly curving. Such a scan characteristic would result in a substantially normal picture near the center of the screen but with undesirable stretching in the horizontal direction near the edges of the screen. To overcome that "stretched-edges" effect, the scan current waveform ideally should have a maximum slope at the time $t_0$ and should have a slightly decreasing slope as it approaches the time $t_1$. Likewise, the scan current at time $t_3$, where the deflection coil current is maximum in the reverse direction, should have a minimum rate of change, and the rate of change of deflection current should increase during the time interval $t_3$–$t_4$ until it reaches a maximum slope at time $t_4$. In short, for large scan angle flat face cathode ray tubes, the ideal scan current for linear spot displacement is slightly S-shaped during the trace interval $t_3$–$t_0$–$t_1$. Such an ideal scan current waveform for large angle cathode ray tubes is illustrated by waveform 56 of FIG. 5.

Figure 2:
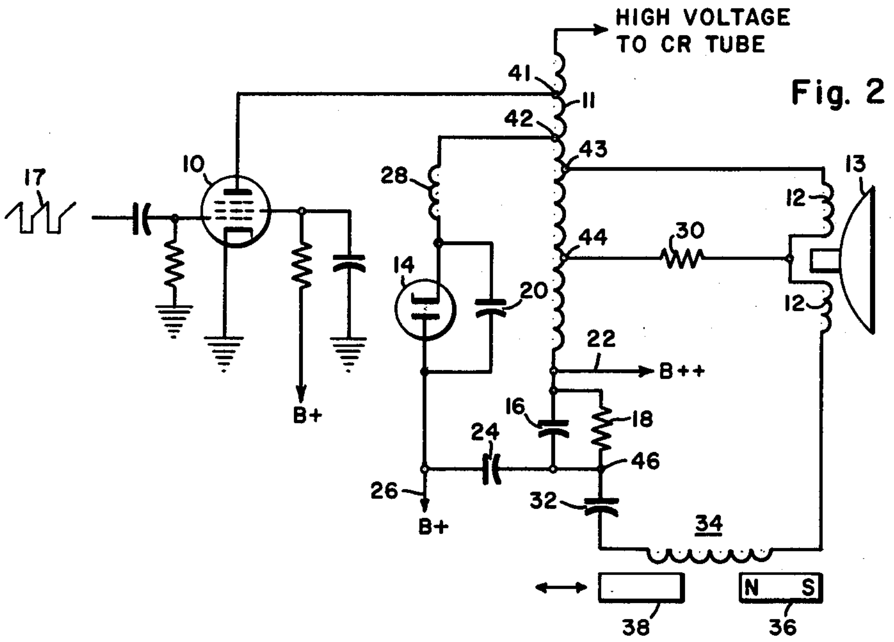
FIG. 2 is a schematic illustration of a horizontal deflection system embodying a preferred form of the present invention.

Referring now to FIG. 2, there is shown a complete horizontal deflection circuit in accordance with the preferred embodiment of the present invention. The deflection system comprises basically the driver tube 10, the transformer 11, which preferably takes the form of an autotransformer, the damper rectifier 14 and the conventional deflection coils 12, which as stated heretofore, comprise a part of the deflection yoke of the cathode ray tube 13. Input signals 17 of saw-tooth waveform are applied through a coupling capacitor to the grid of the pentode driver tube 10. The screen grid of tube 10 is supplied with energizing potential in a conventional manner. The anode is connected to a first intermediate terminal 41 of the autotransformer 11 which has its upper end terminal connected through a usual rectifying device (not shown) to supply high voltage to the second anode of the cathode ray tube. A second intermediate terminal 42 of the transformer 11 is connected through a conventional radio frequency choke 28 to the cathode of damper rectifier 14, the anode of which is connected to the direct current voltage source terminal B+ by way of conductor 26. The damper rectifier 14 is shunted by a capacitor 20. A third intermediate terminal 43 of the transformer 11 is connected to the upper end of the series-connected deflection coils 12 and a fourth intermediate terminal 44 is connected by a resistor 30 to the mid-point of the deflection coils. Resistor 30 is provided in the yoke circuit to limit the tendency of the deflection yoke to oscillatory ringing. The lower end terminal of transformer 11 provides a source of so-called boosted B+ voltage which is applied by way of conductor 22 to circuits of the television receiver which require a higher source voltage than that normally supplied by the direct current source B+. For example, in the preferred embodiment of the present invention, conductor 22 is connected to supply energizing potential to the FM detector of the sound portion of the television receiver.

The lower end of transformer 11 is further connected through a yoke return capacitor 16 shunted by a resistor 18 to a common terminal 46. A so-called "boost" charging capacitor 24 is connected from the common terminal 46 to the B+ source voltage conductor 26. The purpose of the boost charging capacitor 24 is to provide power conservation by recovering the energy which is removed from the deflection yoke by way of the damper tube 14 and which in the absence of capacitor 24 would be dissipated at the plate of the damper tube 14. Such boost charging capacitors are well known in the art, their purpose and function is understood, and, accordingly, need not be described in further detail. Between the common terminal 46 and the lower end of the deflection coil 12, there is connected a series combination comprising a scan linearity and width control inductor 34 and a "flat face correcting" capacitor 32.

In a circuit of the type just described but not having the control inductor 34, the flat face correcting capacitor 32 could be provided in direct connection between the terminal 46 and the lower end of the deflection coil 12. In that arrangement, by astute choice of values for the flat face correcting capacitor 32, the yoke return capacitor 16, and the boost charging capacitor 24, the deflection circuit can be caused to produce a generally exponential scan waveform in which the deflection current waveform would have a maximum slope during the first part of the scan (i.e., just after time $t_3$) and a minimum slope during the latter part of the scan (that is, just before the time $t_1$) with the central portion of the scan waveform having a nominal or average slope at time $t_0$. Such an exponential scan current waveform is illustrated at FIG. 5.

Figure 5B:
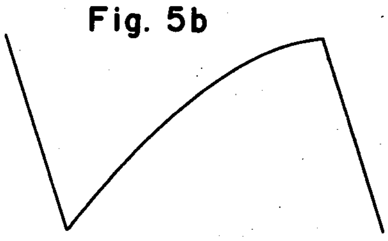
Figure 6A:
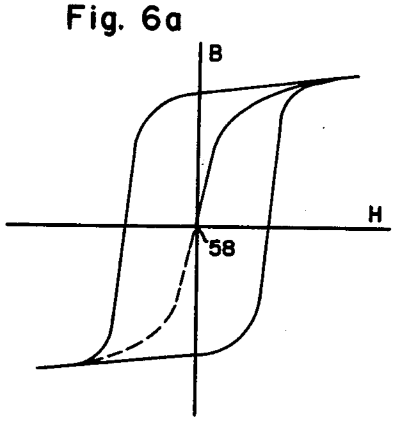
FIGS. 6A and 6B are diagrams illustrating the magnetization characteristic of the linearity and width control reactor used in the preferred embodiment of the invention.
Figure 6B:
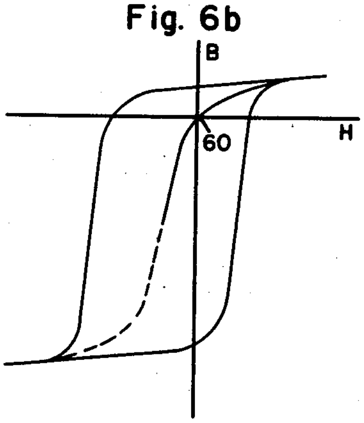

Provision of the "flat face correcting" capacitor 32 in such a supposed circuit would provide approximately the ideally desired curvature in the latter half of the scan current waveform, thereby achieving approximately linear trace for the right-hand side of the cathode ray tube screen. However, the scan current waveform of FIG. 5B is obviously non-symmetrical with the slope of the lower half being very substantially greater or steeper than that of the latter half. That, of course, means that the beam deflection velocity at the left-hand side of the screen would be excessive and the picture would be abnormally stretched at the left-hand side. The present invention solves the foregoing difficulty and restores symmetry to the scan waveform by providing an asymmetrically nonlinear reactance 34 in series with the horizontal deflection coils 12. By "asymmetrically nonlinear reactance" is meant an impedance element which exhibits, for a given current amplitude, two substantially different effective impedances depending on the direction of such given current amplitude. Specifically, in the preferred embodiment, applicants utilize a ferrite core reactor which would normally have a symmetrical saturation curve but which is arranged to operate on a non-symmetrical saturation curve by providing a predetermined fixed magnetic bias or magnetic flux level by use of a magnetic means 36. The normal hysteresis curve of such a ferrite core reactor without magnetic bias is shown in FIG. 6A. The same curve but with the point of operation shifted by means of magnetic biasing is shown in FIG. 6B. With the reactor biased as shown in FIG. 6B, the reactor operates as a bilaterally non-symmetrical or non-linear impedance device that will retard the rate of change of scan current when the scan current is flowing in one direction and will aid it or only slightly retard it when it is flowing in the other direction. In addition the reactor 34 includes a core means 38 which is adjustable to vary the nominal or average impedance of reactor 34.

Figure 5A:
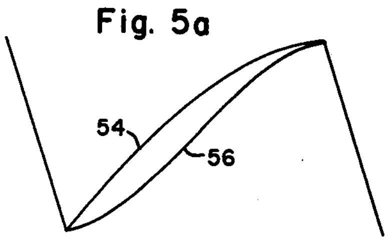
FIGS. 5A and 5B are graphs of current waveforms obtained in practical deflection systems.

In FIG. 5A, curve 54 indicates the generally exponential sweep waveform which would be produced by the circuit of FIG. 2 if the inductor 34 were deleted and the flat face correcting capacitor 32 were connected between common terminal 46 and the lower end of deflection coil 12. In contrast, curve 56 of FIG. 5A indicates the trace deflection current waveform which is produced by the circuit of FIG. 2 with inductor 34 connected as shown and adjusted to have optimum permanent magnetic biasing by a magnetic means shown as 36 in FIG. 2. As shown in curve 56 of FIG. 5A, the rate of change of deflection current during the period $t_3$–$t_4$ has been substantially reduced and the rate of change of deflection current during the period $t_4$–$t_1$ has been increased. That effect is achieved by adding inductance to the circuit during the period $t_3$–$t_4$ to slow down or limit the rate at which the magnetic energy stored in deflection coil 12 is transferred to the boost charging capacitor 24. The fixed magnetic biasing of inductor 34, effected by magnetic means 36, is arranged to be such that it is opposed or at least partially cancelled out by the dynamic magnetic flux created by the damper tube current flowing through inductor 34 during the time $t_3$–$t_4$. Accordingly, during the time $t_3$–$t_4$, inductor 34 provides a maximum auxiliary inductance in the deflection coil circuit, thereby limiting the rate of change of deflection coil current and changing the deflection coil current wave from that shown by curve 54 to that shown by curve 56. As the "reverse" or damper tube current (through the deflection coil 12 and inductor 34) approaches a zero magnitude in the vicinity of time $t_4$, the effect of that current on inductor 34 is removed and inductor 34 reverts to its fixed biased condition where it is at or near saturation. Accordingly, in the vicinity of time $t_4$ and during the time period $t_0$–$t_1$, inductor 34 is saturated and has a relatively small inductance. Accordingly, just prior to the time $t_4$ and during the first portion of the time $t_0$–$t_1$, the deflection coil current is allowed to change at a rate greater than its rate of change during the first portion of the time period $t_3$–$t_4$. Thus, as shown in FIG. 5A, the deflection coil current during the trace period is slightly S-shaped, having a minimum rate of change just after the time $t_3$, having a maximum rate of change in the vicinity of time $t_4$ and again having a minimum rate of change just prior to time $t_1$. That slightly S-shaped deflection current waveform during the trace period is approximately ideal in that it provides a maximum angular velocity of beam deflection near the center of the screen and provides a somewhat lesser angular velocity of beam deflection when the beam is near either side of the cathode ray tube screen. The lesser velocity of angular deflection of the beam near the edges of the screen compensates for the non-linear relationship between deflection angle and spot displacement which exists in wide-angle, flat-face cathode ray tubes.

In FIG. 6A is shown the normal hysteresis or B-H curve of the reactor 34 without magnetic bias applied thereto. Without any fixed magnetic bias, the operating point of such a reactor would be at the point 58 and its effective inductance would be a symmetrical function of current flow therethrough although perhaps being a non-linear function of inductor current. Now, when the inductor 34 is provided with magnetic bias or a fixed unidirectional magnetic flux as indicated by FIG. 6B, its operating point is shifted to the point 60 and the effective inductance is no longer symmetrical with respect to the magnetizing force produced by the deflection current flowing therethrough. Specifically, a deflection coil current of a given magnitude flowing through inductor 34 from right to left as shown in FIG. 2 will dynamically operate the inductor 34 in the third quadrant of FIG. 6B where it will have substantially a maximum inductance. The same given deflection current magnitude flowing in the opposite direction through inductor 34 will operate the inductor to the right of point 60 in FIG. 6B and the inductor 34 will be substantially saturated so that it has a relatively very small inductance.

Figure 3:
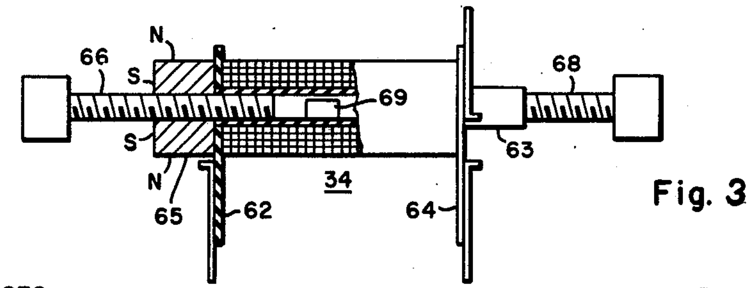
FIG. 3 is a side view partially in section illustrating the linearity and width control inductor utilized in the preferred embodiment of the invention.

The physical construction of the asymmetrically nonlinear inductor 34 is shown in FIG. 3. The inductor 34 comprises, in a preferred embodiment, approximately 800 turns of No. 26 wire wound in a plurality of layers on an elongated cylindrical coil form between support members 62 and 64. On the outer face of the support member 62 there is secured a toroidal permanent magnet 65 which preferably is formed of ferrite material and is magnetized radially to have its north pole at the inner diameter and its south poles at the periphery or vice versa. A first magnetic conducting ferrite core member 66 is externally threaded to mate with threads on the interior of coil form 63 whereby the core member 66 is rotatably adjustable to move axially within the inductor 34. With the ferrite adjusting screw 66 removed, or substantially removed from interior of the coil winding, the toroidal magnet 65 has a negligible effect on the coil and the coil would be operative on a hysteresis curve as shown in FIG. 6A with an operating point 58. With the ferrite adjusting screw or core member 66 inserted to an optimum position within the magnet 65 and the inductor winding, the saturation characteristic or hysteresis loop provided by the inductor 34 is substantially as shown in FIG. 6B.

At the opposite end of the inductor structure, there is provided a second magnetic conducting ferrite core member 68 which is similarly threaded to be axially movable into the coil form 63. The core member 68 is not permanently magnetized and accordingly has no effect on the position of the operating point relative to the axes of symmetry of the hysteresis loop. Adjustment of core member 68 provides for adjustment of the magnetic reluctance of the over-all flux path of the inductor 34, thereby providing for adjustment of the average or nominal inductance of the structure. Moving core member 68 further into the coil increases the average inductance of the inductor 34 so that a greater portion of any applied voltage waveform appears thereacross, and a correspondingly lesser proportion of such voltage appears across the deflection coils 12. In this manner the inductor 34 with adjustable core member 68 provides means for adjusting the scan width or raster width on the cathode ray tube 13. It will be appreciated that as long as the air gap between the inner ends of the first and second core members is substantial there will be very little interaction between the linearity control provided by the first core member and the width control provided by the second core member 68. To prevent the core members 66 and 68 from being adjusted to positions so close together as to allow the permanent magnet 65 to effect the core member 68, a non-magnetic movable spacer 69 may be loosely carried within the coil winding form 63 between the inner ends of the core members 66 and 68. It has been found that the spacer member 69 or other means to prevent the inner ends of the core members from butting together preferably should provide an air gap between the ends of the cores of not less than about .015 inch to provide sufficient magnetic isolation. In the preferred embodiment of the inductor 34 of the present invention, the coil preferably has measured inductance values as follows when a 1,000 cycle signal is applied:

| | Millihenries |
|---|---|
| With both core members removed | 1.1 |
| With core member 68 only fully inserted | 3.75 |

The following table gives by way of example particular values for the various components in a circuit which has been operated successfully. These values are set forth by way of example only, and the invention is not to be considered as limited to these values nor to any of them.

| | | |
|---|---|---|
| Driver tube **10** | | 6DQ6B |
| Damper rectifier **14** | | 6AX4GT |
| Capacitor **20** | mfd | 100 |
| B+ voltage at **26** | volts | 265 |
| Capacitor **32** | mfd | .047 |
| Capacitor **16** | mfd | .0047 |
| Capacitor **24** | mfd | .033 |
| Resistor **18** | ohms | 39,000 |
| Resistor **30** | do | 4,700 |

While there has been shown and described a preferred embodiment of the present invention, other modifications thereof will readily occur to those skilled in the art. It will be obvious to those skilled in the art that the present invention is not limited to the single embodiment shown and described but is susceptible of various changes and modifications without departing from the spirit and scope of the invention.

We claim as our invention:

1. In a television receiver, an electromagnetic beam deflection system for the cathode ray tube comprising, a deflection coil associated with said tube for producing a beam deflecting electromagnetic field therein, a source of sawtooth waveform current, an asymmetrically nonlinear inductor coil connected serially with said deflection coil and said source, said inductor coil comprising a helical coil, a permanent magnet fixedly disposed adjacent said inductor coil to establish a static magnetic flux component therein of a sufficient magnitude to cause asymmetrical saturation of said inductor coil in response to sawtooth deflection current flowing therethrough, a first core member comprising a magnetic conducting material and being disposed at one end of said inductor coil adjacent said permanent magnet, said first core member being operative to be moved axially with respect to said inductor coil for controlling the amount of magnetic flux linking said inductor coil from said permanent magnet for varying the asymmetrical properties of said inductor coil, and a second core member comprising a high permeability material and being disposed at the other end of said inductor coil and being operative to move axially with respect to said inductor coil for varying the nominal impedance of said inductor coil.

2. In a television receiver, an electromagnetic beam deflection system for the cathode ray tube comprising, a deflection coil associated with said tube for producing a beam deflecting electromagnetic field therein, a source of sawtooth waveform current, an asymmetrically nonlinear inductor coil connected serially with said deflection coil and said source, said inductor coil comprising an elongated cylinder, a permanent magnet fixedly disposed adjacent said inductor coil to establish a static magnetic flux component therein of a sufficient magnitude to cause asymmetrical saturation of said inductor coil in response to sawtooth deflection current flowing therethrough, an asymmetry adjusting core member comprising a high permeability material being disposed at one end of said inductor coil adjacent said permanent magnet, said adjusting core member being operative to be moved axially within said inductor coil for controlling the amount of magnetic flux linking said inductor coil from said permanent magnet for varying the asymmetrical properties of said inductor coil, an impedance adjusting core member comprising a magnetic conducting material and being disposed at the other end of said inductor coil and being operative to move axially within said inductor coil for varying the nominal impedance of said inductor coil, and a non-magnetic spacer disposed within said inductor coil between the inner ends of said core members to magnetically isolate said core members from each other.

3. In a deflection circuit for a cathode ray tube, the combination of: a deflection coil, an asymmetrically nonlinear inductor coil which presents a different inductance for current passing in different directions therein, said inductor coil connected in series with said deflection coil and comprising a helical coil having open ends, a permanent magnet device fixedly disposed adjacent said inductor coil to apply a static magnetic field thereto, an asymmetry adjusting core comprising a magnetic conducting material disposed at one end of said inductor coil adjacent said permanent magnet device to be axially movable within said inductor coil along its helical axis for varying the amount of static magnetic flux linking said inductor coil from said permanent magnet device and thereby varying the asymmetrical properties of said inductor coil, and an impedance adjusting core disposed adjacent said inductor coil at the end opposite said permanent magnet device and comprising a magnetic conducting material, said impedance adjusting core being magnetically isolate from said asymmetry adjusting core and axially movable within said inductor coil along its helical axis to adjust the nominal inductance of said inductor coil.

References Cited in the file of this patent

UNITED STATES PATENTS 2,702,874 Adler ------------------ Feb. 22, 1955

FOREIGN PATENTS 735,512 Great Britain ---------- Aug. 24, 1955